United States Patent

McNeely, Jr.

[15] 3,680,833
[45] Aug. 1, 1972

[54] VALVE
[72] Inventor: Branch M. McNeely, Jr., Bellaire, Tex.
[73] Assignee: Keystone Valve Corp.
[22] Filed: Sept. 15, 1970
[21] Appl. No.: 72,304

[52] U.S. Cl. ................................. 251/283, 251/305
[51] Int. Cl. ........................................... F16k 39/00
[58] Field of Search ................... 251/283, 305, 306

[56] References Cited

UNITED STATES PATENTS

| | | |
|---|---|---|
| 2,596,787 | 5/1952 | Ottinger et al. ............ 251/305 X |
| 3,442,489 | 5/1969 | Cary et al. ..................... 251/305 |
| 824,166 | 6/1906 | Aiken ........................ 251/305 X |
| 2,010,694 | 8/1935 | Jones ........................ 251/305 X |
| 2,114,168 | 4/1938 | Augur ........................... 251/305 |
| 3,516,640 | 6/1970 | Bryer et al. ................... 251/305 |

FOREIGN PATENTS OR APPLICATIONS

| | | |
|---|---|---|
| 184,011 | 12/1955 | Austria ......................... 251/305 |
| 881,436 | 11/1961 | Great Britain ................. 251/305 |

*Primary Examiner*—Henry T. Klinksiek
*Attorney*—Ralph R. Browning

[57] ABSTRACT

A valve of the butterfly type wherein the valve closure means has a pair of symmetrically disposed vanes having peripheral edges which lie in non-coincident planes eccentrically disposed to the axis of rotation passing through the hub of the valve closure means.

2 Claims, 7 Drawing Figures

PATENTED AUG 1 1972 3,680,833

Branch M McNeely, Jr.
INVENTOR

BY Ralph R. Browning

ATTORNEY

Branch M. McNeely, Jr.
INVENTOR

BY Ralph R. Browning
ATTORNEY

VALVE

BACKGROUND OF THE INVENTION

The present invention relates to valves and more particularly to valves of the butterfly or disc type.

While valves of the so-called "butterfly" or "disc" type are widely known and used industrially, they have certain inherent operational limitations which curtail their utility. For example, in such valves a metal-to-metal or metal-to-resilient material sealing means is generally provided. In order to ensure that the valve will be effective against leakage, it is necessary that contact between the sealing edges of the closure member and the valve seat, i.e., the sealing means, be maintained against operating pressures. When a resilient seating member is employed, which is usually the case in such valves, sealing is accomplished at least partially by the radially outward deformation of the seat adjacent the periphery of the closure member with the consequence that the seat member exerts a sealing pressure against the edges of the disc. Since deformation of the resilient seating member is accomplished through sliding contact with the closure, there is substantial drag or friction between the edges of the closure member and the seating member as the former is moved to and from the closed position. The principal contact characteristic between the rotatable valve closure member and the valve seat is what is known as the contact angle. Contact angle may be defined as the angle, taken in the plane of a disc radius drawn through the center of the disc, which lies between the valve seat and a line drawn tangentially to the disc at the point of contact between the disc edge and the seat. A large contact angle reduces required torsional forces and a small angle increases torsional forces.

In conventional butterfly valves, wherein the sealing edges of the disc lie co-planar with the rotating axis of the disc and wherein a plane passing through the disc is transverse to the long axis of the valve body when the disc is in the closed position contact angle is 0°. In the butterfly valves of the angle closure type wherein the disc is elliptical and seating is achieved at an acute angle to the transverse axis of the valve bore, the contact angle decreases rapidly from maximum at a point normal to the shaft axis to 0° at the shaft intersection. There thus exists substantial drag and the need for relatively high torque to seat and unseat the disc. The amount of torque necessary to seat and unseat the closure member of a valve is a significant factor in systems where the valve is activated by actuators of the pneumatic, hydraulic, electric or some other type, larger torque requirements requiring larger actuators.

Another operational limitation of conventional butterfly valves is that for the valve to be in the completely open position, i.e., present a disc profile equal to the hub diameter, it is necessary that the disc be rotated almost 90° depending on the relative thickness of the hub to the disc. It is apparent that a valve actuator having a given amount of available energy will produce a higher torque if a smaller degree of rotation is required. Thus, a conventional butterfly valve requires an actuator having more available torsional capacity in order to be rotated to a completely open position than a valve requiring less rotation to assume an open position. Here again, actuator sizing becomes important.

Most butterfly valves in commercial usage are not suitable as proportioning valves for flow conditions existing at vane openings between about 0° and 20° because the flow rate through a conventional butterfly valve at such low vane angles is generally non-linear. This severely reduces the utility of the valve as a proportioning control device in the lower range of openings of the disc.

Another operational characteristic associated with a conventional disc valve, is that when the disc is in a 90° open position and there is turbulent flow through the valve, a net torsional moment max exist tending to close the disc. As a consequence of this, it is necessary, that an actuator employed with the valve be of a type that will assure a locked position of the disc to prevent the disc from being moved into the flow and slammed closed possibly causing rupture of the line.

In a conventional disc valve, a closed disc, under pressure, is loaded differentially much in the manner that a beam is loaded. Consequently, it is necessary, depending upon the maximum pressure to be realized, that the disc be of sufficient strength to withstand the pressure. This invariably requires that for higher pressures, the disc weight be increased. This of course increases the weight of the overall valve and substantially increases material cost.

Since as explained above, there is considerable drag between the seat member of the valve and the closure member seating edge as the latter is moved from open to closed position, the valve seat undergoes substantial wear necessitating frequent replacement. This is an expensive procedure both in terms of materials and in maintenance time required to replace the worn seats.

SUMMARY OF THE INVENTION

It is therefore an object of the present invention to provide an improved valve having improved seating characteristics.

It is another object of the present invention to provide an improved valve of the butterfly type which has substantially better flow and control characteristics than prior art valves.

An important object of the present invention is to provide an improved valve of the butterfly or disc type which requires minimum torque for opening and closing.

Still another object of the present invention is to provide an improved butterfly-type valve wherein the valve closure member has an improved strength to weight ratio resulting in reduced material cost of the closure member.

Another object of the present invention is to provide an improved valve of the butterfly type having a renewable seating surface without the necessity of a change in valve components.

These and other objects of the present invention will become apparent from the drawings, the description given herein and the appended claims.

In accordance with the above objects, the present invention provides an improved valve of the butterfly type, having a valve casing means with a flowway therethrough, suitable valve seating means disposed within the valve casing means and substantially surrounding the flowway and an offset valve closure means movably mounted within the valve casing means to control flow through the flowway. The valve closure means has a central body portion or hub through which extends the axis of rotation of the closure means and first and second offset closure vanes. The peripheral edge of the first closure vane lies in a plane disposed eccentrically to the axis of rotation through the hub and the peripheral edge of the second vane also lies in a plane eccentrically disposed to the axis of rotation of the hub. The first and second planes eccentrically disposed to the axis of rotation of the hub are non-coincident and lie on opposite sides of the hub or the central body portion.

DESCRIPTION OF SPECIFIC EMBODIMENTS

Figure 1:
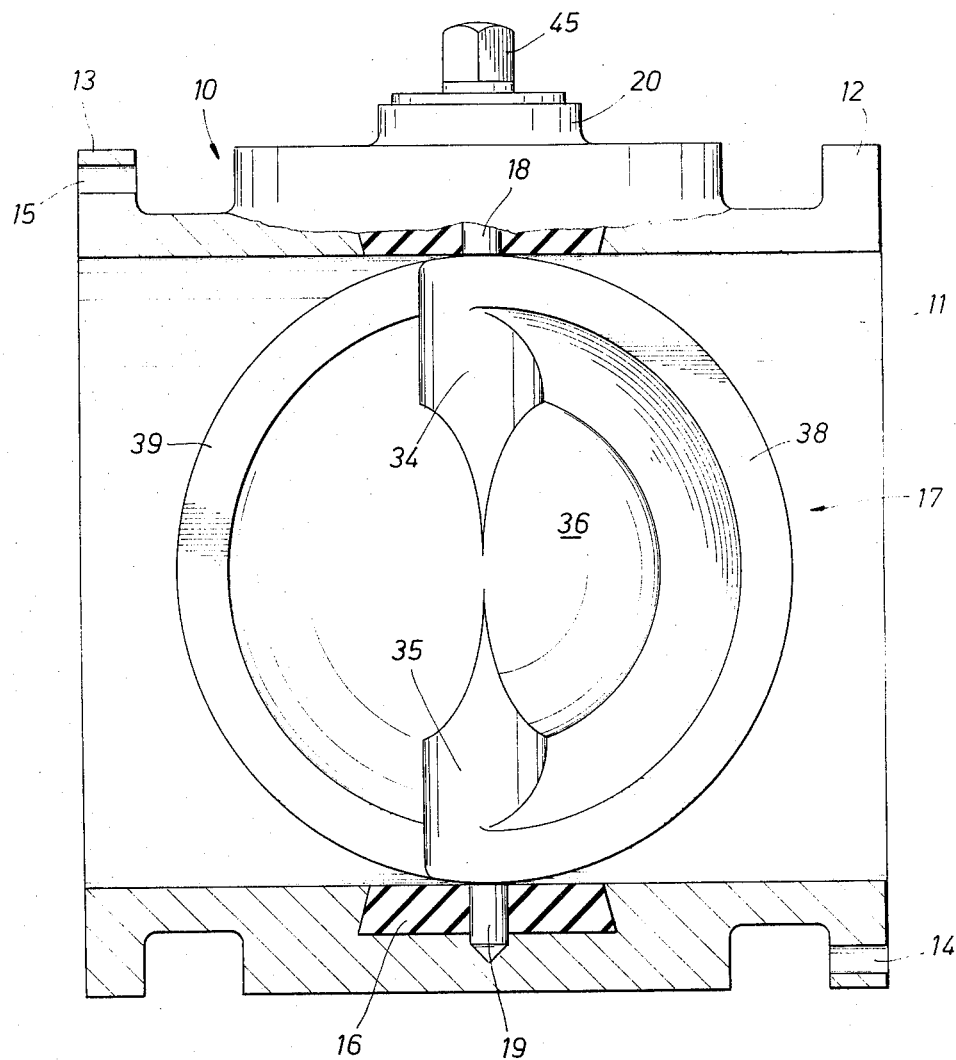
FIG. 1 is an elevational view, partly in section, of the valve of the present invention showing a typical form of the novel valve closure means.
Figure 2:
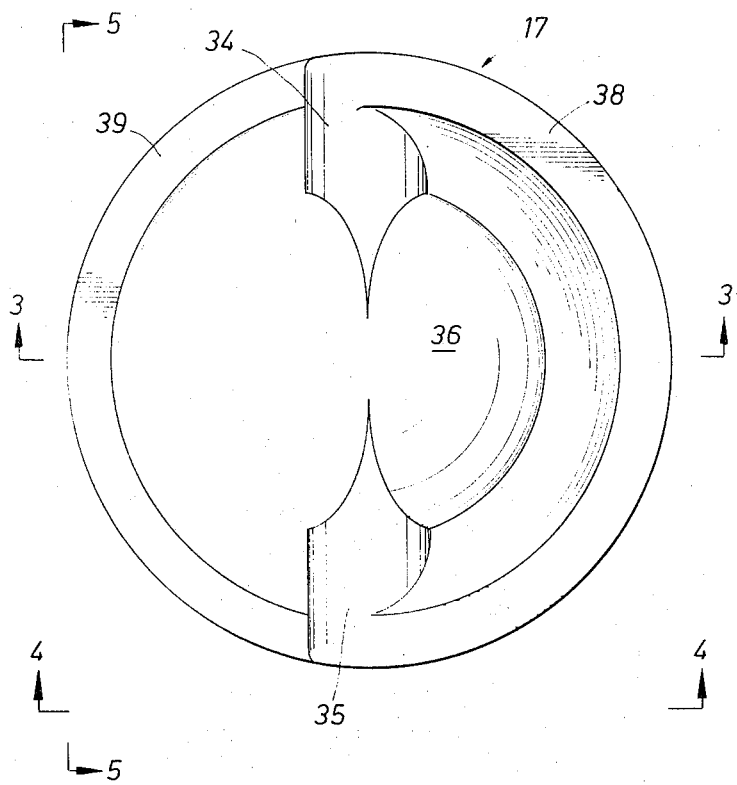
FIG. 2 is an isometric view of the valve closure means of FIG. 1.
Figure 5:
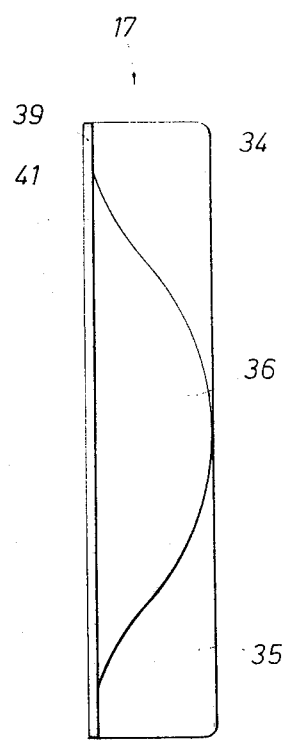
FIG. 5 is a view taken along the line of 5—5 of FIG. 2.

For an illustrated specific, non-limiting embodiment of the present invention, reference is made to the accompanying drawings. Referring then to the Figures and particularly to FIG. 1, there is shown a valve body or casing shown generally as 10 having a cylindrical flowway 11 therethrough. Body 10 has opposing flange members 12 and 13 with suitable holes 14 and 15 extending therethrough by which valve casing 10 can be connected in a conduit between suitable flanges which mate with flanges 12 and 13. Disposed within casing 10 is a valve seat 16 which, while generally of a resilient material, can be metal. It is to be understood when speaking of a valve seat or valve seating means herein that in certain types of valves as for example those constructed from plastic materials, the inside surface of the valve body constitutes the seating surface. Therefore, when the term valve seat or seating surface is used herein, it is meant to include separate valve seats inserted within the valve body or the inside surface of the valve body itself if such acts as the seating surface. Seat member 16 comprises an annular body which substantially surrounds flowway 11.

Rotatably mounted within flowway 11 in valve casing 10 is a valve closure means shown generally as 17. Closure means 17 is mounted within body 10 by means of a valve stem having upper and lower portions 18 and 19 respectively which extend through openings in seat member 16. Lower valve stem 19 is journaled in the lower portion of casing 10 while upper valve stem 18 is journaled in the upper portion of body 10 and has a part 45 extending exteriorly of casing 10 for manipulation by a suitable tool or actuator for rotating closure means 17 between its open and closed positions. While closure means 17 is shown as being rotatably mounted by means of a single valve stem, extruding centrally through closure means 17, it is obvious that two valve stems, one at each end of closure means 17 can be employed. Extending outwardly from body 10 is a neck portion 20 through which the upper part 45 of the valve stem upper portion 18 extends. While not shown, neck 20 contains a bushing and seal assembly used to seal off around valve stem upper portion 18 and prevent leakage at that point in the valve.

Figure 3:
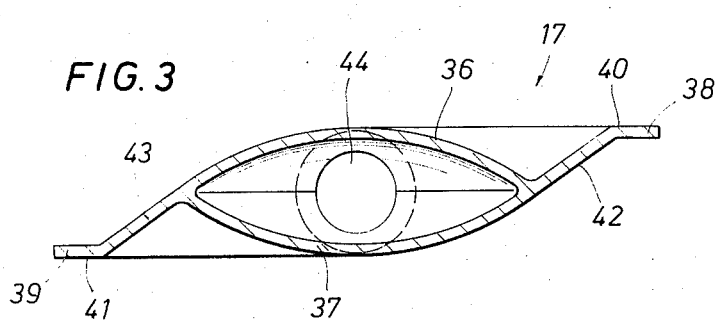
FIG. 3 is a view taken along the line of 3—3 of FIG. 2.

Referring next to FIGS. 2-5, it is seen that valve closure element 17 comprises a central body portion and a pair of symmetrically disposed closure vanes. The central body portion of valve closure means 17 comprises two substantially cylindrical co-axial portion 34 and 35 which are of substantially equal length and which extend from and intersect a pair of dome shaped members 36 and 37. Dome shaped members 36 and 37 are joined along their bases so as to form a substantially hollow chamber intersected by a bore 44 extending through portions 34 and 35. As best seen in FIG. 3, the adjoined dome shaped member 36 and 37 have their apexes co-planar with the surfaces of the intersecting cylindrical portions 34 and 35. In other words, the perpendicular distance between the apexes of the dome shaped members 36 and 37 is substantially equal to the outside diameter of the cylindrical portions 34 and 35. Referring to FIG. 3, it is seen that the plane passing through the intersection of dome shaped members 36 and 37 is co-planar with a plane which is coincident with a diameter of cylindrical member 34 and 35. In general, closure means 17 is a generally symmetrical body.

Figure 4:
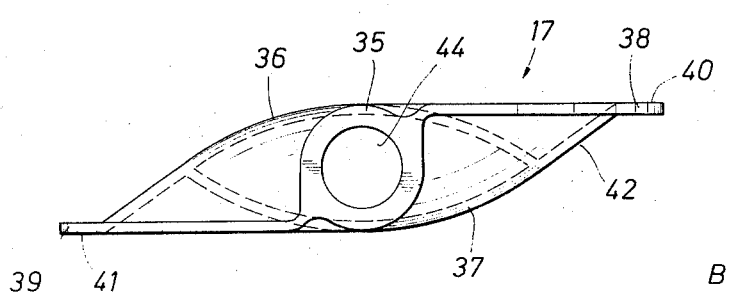
FIG. 4 is a view taken along the line of 4—4 of FIG. 2.
Figure 6:
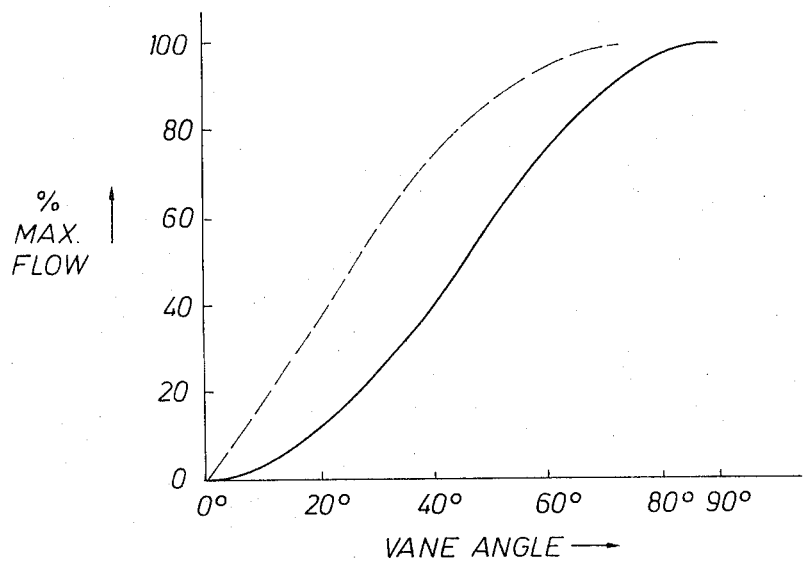
FIG. 6 is a graph showing the relationship of flow through a valve versus vane angle opening for a conventional butterfly valve (solid line) as compared with the improved valve (dotted line) of the present invention.

The closure vanes of means 17 may be considered as comprising flat, substantially semi-annular members 38 and 39, respective ends of which are adjoined to the cylindrical portions 34 and 35 adjacent their free ends. As best seen in FIG. 4, semi-annular members 38 and 39 adjoin cylindrical portions 35 and 34 on opposite sides of the axis of rotation passing through cylindrical portion 34 and 35, said axis of rotation being the coaxial axis of cylindrical members 34 and 35. Semi-annular members 38 and 39 have faces 40 and 41 respectively, which face in opposite directions from one another and which lie on opposite faces of valve closure means 17. Face 40 lies in a plane which is substantially tangential to the surfaces of cylindrical portions 34 and 35 and the apex of dome shaped member 36. Surface 41 lies in a plane which is substantially tangential to opposing surfaces of cylindrical members 34 and 35 and the apex of dome shaped member 37, the planes containing faces 40 and 41 respectively being parallel. Semi-annular members 38 and 39 are adjoined to the central body portion, comprised of the dome shaped members 36 and 37 and the intersecting cylindrical portions 34 and 35, by means of curved section 42 and 43 respectively. Curved section 42 extends from the inside periphery of semi-annular member 38 and adjoins the intersection of dome shaped members 36 and 37, curved section 42 being actually an extension of dome shaped member 37 and having substantially the same radius of curvature as dome shaped member 37. As best seen in FIG. 3, curved section 42 and the outside surface of dome shaped member 37 form a substantially smooth uniform surface which extends to the inside periphery of semi-annular member 38. Curved section 43 which adjoins semi-annular member 39 with the central body portion of valve closure means 17 adjoins semi-annular member 39 at its inside periphery and extends inwardly towards the intersection of dome shaped members 36 and 37, curve surface 43 being an extension of dome shaped portion 36 and having generally the same radius of curvature as dome shaped portion 36 whereby a smooth uniform surface is formed. The vanes of closure means 17 are in effect inverted minor images of one another when viewed diagonally across the axis of rotation.

While the various component parts of valve closure means 17 have been described separately for purposes of clarifying the structure of closure means 17, it is to be understood that generally closure means 17 comprises a single integral piece which is generally cast and that all intersecting surfaces and parts flow together in a smooth fashion. Closure means 17 is substantially circular when viewed in a plane parallel to the planes passing through the peripheral edges of the vanes.

As will be evident from the above description, numerous shapes and designs embodying the principle of the present invention can be used in instrumenting the valve closure means, the fundamental characteristic being that the peripheral edges of the closure vanes lie in planes which are non-coincident and on opposite sides of the axis of rotation passing through the central body portion, i.e. planes eccentrically disposed to the axis of rotation. Furthermore, while such planes in the embodiment shown, are parallel, this is not necessary. It is for example, conceivable that planes containing one of the peripheral edges be disposed at an angle to the other of said planes in such a fashion that one of these vanes would have a periphery having an elliptical curvature while the periphery of the other vane would have a circular curvature.

While in the usual case and as pointed out above, the valve closure means when viewed in a plane substantially parallel to the planes containing the peripheral edges, when such planes are also parallel, will have circular perimeter, it is possible to design valve closure means embodying the principle of the present invention wherein such a profile would be elliptical. For example, in valves where the closure member seats at an acute angle to the transverse axis of the flowway through the valve body, the perimeter of the face of the valve closure means herein would be elliptical.

Figure 7:
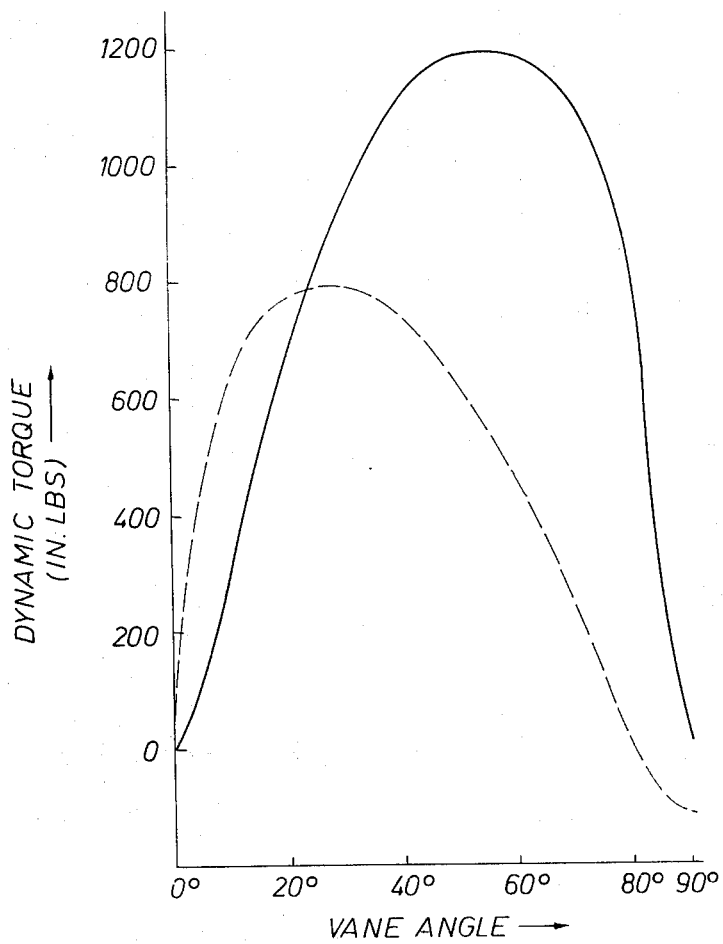
FIG. 7 is a graph showing the relationship of dynamic torque acting on a valve disc versus vane angle for a conventional butterfly valve (solid line) and the improved valve (dotted line) of the present invention.

Some specific advantages of the valve of the present invention are best shown by reference to FIGS. 7 and 8. In FIG. 7 the relationship of flow through the valve vs. vane angle is plotted. As seen, for a given flow rate through the valve, the conventional butterfly valve requires a greater degree of opening of the closure means or disc than the improved valve of the present invention. This characteristic is operationally significant in that the total energy capacity of actuators utilized with butterfly valves is utilized over the required angle of rotation of the closure means. It can be seen that in the conventional type closure the distance of travel or actuator energy output is necessarily distributed over a larger angle than in the case for the offset closure of the present invention. In other words, the torsional capability of the actuator is less. Thus for example, an actuator having a 100 ft. lbs. of available energy utilized to produce 60° of rotation will produce a higher torque output than if utilized to produce 90° of rotation. This means that a given actuator has more available torsional capacity for opening and closing a valve of the present invention than for a conventional type butterfly valve. Alternately, it means a smaller actuator can be used with the improved valve of the present invention than would be necessary with a conventional type butterfly valve. FIG. 7 also depicts another very important advantage of the improved valve of the present invention. It will be seen that in a conventional type butterfly valve, the first 15° or 20° of opening and the last 15° or 20° of opening are of a variable, comparatively gradual slope. Note, however, that with the improved valve of the present invention the initial slope, i.e. the first 15°–20° of vane angle opening, is approximately linear and relatively steep. In commercial practice, it is generally advantageous to utilize only the linear portions of the curve for proportioning service. Thus, in conventional closures, the valves are generally sized for flow conditions to operate approximately between 20° and 70° of a total 90° vane angle opening. In the improved valve of the present invention, this range of operation may cover approximately 0° to 60° opening of an approximate 80° toatal. This not only constitutes a larger useful percentage of total available range, but more importantly it incorporates the initial portion, i.e. the lower range of opening.

The next area of consideration relates to the dynamics of flow across a partially open disc. As previously noted, in a conventional type butterfly valve, when the closure means or disc is partially open, and there is flow through the valve, a torsional moment is exerted by the fluid tending to close the valve. The torque exerted by the fluid against the disc is called dynamic torque. As can be seen by looking at FIG. 8, (a typical plot of Dynamic Torque vs. Vane Angle) in an improved type valve of the present invention, having a design angle, i.e. contact angle, of 12 ½°, fluid flow produces a closing moment through vane angles from 0° to 90° opening less design angle, i.e. 12 ½° and opening moment through the last 12 ½°. This constitutes an advantage for valves normally maintained in full open positions in that flow will maintain this position against a stop, whereas with a conventional type valve an actuator must be chosen which will assure an open locked position to guard against the possibility of the valve being slammed shut when in service. Another important advantage of the improved valve of the present invention can be seen in FIG. 8, in that the offset type valve disclosed herein materially reduces the maximum dynamic torque realized.

It has been found, using a 12 ½° design angle, that the improved valve herein is completely non-locking and will unseat without torsional effort. This of course means that actuators used to operate the valve can be sized smaller. Another important advantage is that the total angle of rotation of the closure means required to bring it into a maximum open position is less than that required for conventional type butterfly valves by the amount of design angle. For example, an offset type valve having a design angle of 12 ½° requires only about 77 ½° of rotation to present a disc profile equal to the hub diameter.

The improved valve herein inherently possesses advantages related to fabrication and maintenance. The closed disc of a butterfly valve is loaded by differential pressure in the manner of a beam. As will be readily recognized, the closure means or "disc" of the present invention provides a beam having a greater section modulus than a configuration having its mass on the center line. This simply means that the improved closure means possesses higher section modulus with lower weight than a conventional type closure means. From a maintenance point of view, it can be seen from FIG. 1, that if valve seating means 16 is rotated about an axis transverse to the flowway of the valve and the axis of rotation of closure means 17, the closure vane of closure means 17 will then be seating on a new surface. This is significant in that a valve having worn or eroded seating surfaces may be repaired by simply reassembly without the necessity for replacing the entire seat. Phrased in another way, it means that a single valve seating means will last twice as long.

CLAIMS

1. A butterfly type valve comprising valve casing means having a flowway therethrough,
   valve seating means disposed within said valve casing means in substantially surrounding relation to said flowway, and
   valve closure means rotatably mounted within said valve casing means for movement between open and closed positions of said flowway, said valve closure means having a central body portion, the axis of rotation, of said closure means passing through said central body portion, and first and second vanes attached to said central body portion, said first and second vanes sealingly engaging said valve seating means when said valve closure means is in said closed position, the peripheral edge of said first vane lying in a first plane eccentrically disposed to said axis of rotation, the peripheral edge of said second vane lying in a second plane eccentrically disposed to said axis of rotation, said first and second planes being non-coincident and on opposite sides of said axis of rotation wherein said first and second planes are substantially parallel wherein said central body portion comprises a pair of cylindrical, co-axial members one end of each of which intersects and extends from a pair of dome shaped members joined at their bases, the diameter of said cylindrical members being substantially equal to the perpendicular distance between the apexes of said dome shaped members, a plane passing through the intersection of said dome shaped members being coincident with a diameter through said cylindrical members, each of said vanes comprising a flat, substantially semi-annular member having first and second faces, respective ends of said semi-annular members being adjoined to said cylindrical members adjacent the free ends of said cylindrical members, said first face of said semi-annular member comprising said first vane lying in a plane substantially tangential to the surface of said cylindrical members and the apex of one of said dome shaped members, said first face of said semi-annular member comprising said second vane lying in a plane substantially tangential to the surface of said cylindrical members and the apex of the other of said dome shaped members, said first and second vanes further comprising curved sections which adjoin said semi-annular flat members to said central body portion, said curved section comprising said first vane constituting an extension of one of said dome shaped members and being adjoined to the inside periphery of said semi-annular member of said first vane, said curved section comprising said second vane constituting an extension of the other of said dome shaped members and being adjoined to the inside periphery of said semi-annular member of said second vane, the outside surfaces of each of said dome shaped members and the connecting curved surfaces being at all points of their intersection smooth and uniform, said second faces of said semi-annular members lying in non-coincident planes.

2. A valve closure means for rotatably mounting in a butterfly type valve comprising
   a central body portion, the axis of rotation, of said valve closure means passing longitudinally through said central body portion,
   and first and second vanes attached to said central body portion, the peripheral edge of said first vane lying in a first plane eccentrically disposed to said axis of rotation, the peripheral edge of said second vane lying in a second plane eccentrically disposed to said axis of rotation, said first and second planes being non-coincident and on opposite sides of said axis of rotation
   wherein the first and second planes are substantially parallel
   wherein said central body portion comprises a pair of cylindrical, co-axial members one end of each of which intersects and extends from a pair of dome shaped members joined at their bases, the diameter of said cylindrical members being substantially equal to the perpendicular distance between the apex of said dome shaped members, a plane passing through the intersection of said dome shaped members being coincident with a diameter through said cylindrical members, each of said vanes comprising a flat, substantially semi-annular member having first and second faces respective ends of said semi-annular members being adjoined to said cylindrical members adjacent the free ends of said cylindrical members, said first face of said semi-annular member comprising said first vane lying in a plane substantially tangential to the surface of said cylindrical members and the apex of one of said dome shaped members, said first faces of said semi-annular member comprising said second vane lying in a plane substantially tangential to the surface of said cylindrical members and the apex of the other of said dome shaped members, said first and second vanes further comprising curved sections which adjoin said semi-annular flat members to said central body portion, said curved section comprising said first vane constituting an extension of one of said dome shaped members and being adjoined to the inside periphery of said semi-annular member of said first vane, said curved section comprising said second vane constituting an extension of the other of said dome shaped members and being adjoined to the inside periphery of said semi-annular member of said second vane, the outside surfaces of each of said dome shaped members and the connecting curved surfaces being at all points of their intersections smooth and uniform said second faces of said semi-annular members lying in non-coincident planes.

* * * * *